(12) United States Patent
Jarosch et al.

(10) Patent No.: US 12,400,220 B2
(45) Date of Patent: Aug. 26, 2025

(54) ENCAPSULATION OF PAYMENT ACCOUNTS WITH TOKENIZATION

(71) Applicant: Block, Inc., San Francisco, CA (US)

(72) Inventors: Dennis Jarosch, Berkeley, CA (US); Gillian May Lian Wee, Brooklyn, NY (US); Paul Abraham Botros, Berkeley, CA (US); Michael Ward, San Francisco, CA (US); Anusha Ramanujam, San Francisco, CA (US); Julian Hua, Walnut Creek, CA (US)

(73) Assignee: Block, Inc., Oakland, CA (US)

( * ) Notice: Subject to any disclaimer, the term of this patent is extended or adjusted under 35 U.S.C. 154(b) by 0 days.

(21) Appl. No.: 17/986,794

(22) Filed: Nov. 14, 2022

(65) Prior Publication Data

US 2025/0156858 A1    May 15, 2025

Related U.S. Application Data

(63) Continuation of application No. 16/145,072, filed on Sep. 27, 2018, now Pat. No. 11,514,437.

(51) Int. Cl.
*G06Q 20/38* (2012.01)

(52) U.S. Cl.
CPC ... *G06Q 20/38215* (2013.01); *G06Q 2220/00* (2013.01)

(58) Field of Classification Search
CPC .............. G06Q 20/38215; G06Q 20/00–425
USPC ........................................................ 705/76
See application file for complete search history.

(56) References Cited

U.S. PATENT DOCUMENTS

| | | | |
|---|---|---|---|
| 5,892,900 A | 4/1999 | Ginter et al. | |
| 9,251,372 B1 * | 2/2016 | Lahoz | G06F 21/6245 |
| 10,515,358 B2 * | 12/2019 | Nagasundaram | G06Q 20/401 |
| 10,977,657 B2 * | 4/2021 | Patterson | G06Q 20/401 |
| 11,514,437 B1 | 11/2022 | Jarosch et al. | |
| 2009/0254440 A1 | 10/2009 | Pharris | |
| 2012/0233005 A1 * | 9/2012 | White | G06Q 20/3226 |
| | | | 705/18 |
| 2013/0268438 A1 | 10/2013 | Boyle | |
| 2015/0046338 A1 | 2/2015 | Laxminarayanan et al. | |
| 2015/0178724 A1 | 6/2015 | Ngo et al. | |

(Continued)

*Primary Examiner* — Mohammad A. Nilforoush
(74) *Attorney, Agent, or Firm* — Lee & Hayes, P.C.

(57) ABSTRACT

A method for encapsulating transaction instrument information in a transaction includes storing, in association with a first transaction and by a processor of the primary transaction processor server, transaction data associated with a transaction instrument for a first transaction. The primary transaction processor server transmits the transaction data to a payment network processor, and receives an authorization package in response that includes a cryptograph and a first network token. The primary transaction processor server generates a second token that includes a changeable alphanumeric string associated with the transaction instrument used in the first transaction, and transmits the second token to a merchant device. The second token indicates that a transaction associated with the second token is either i) a customer-initiated transaction or ii) a merchant-initiated transaction. The secondary transaction processor may approve or reject a transaction using the second token without a cryptogram.

20 Claims, 7 Drawing Sheets

(56) References Cited

U.S. PATENT DOCUMENTS

| | | | |
|---|---|---|---|
| 2015/0262161 A1 | 9/2015 | McMullan et al. | |
| 2016/0086187 A1 | 3/2016 | Joao | |
| 2016/0217465 A1* | 7/2016 | Gaur | G06Q 20/401 |
| 2016/0301683 A1 | 10/2016 | Laxminarayanan et al. | |
| 2017/0149740 A1 | 5/2017 | Mansour et al. | |
| 2017/0222804 A1 | 8/2017 | Dewitt et al. | |
| 2018/0006821 A1* | 1/2018 | Kinagi | H04W 12/61 |
| 2018/0253727 A1 | 9/2018 | Ortiz et al. | |
| 2019/0012661 A1 | 1/2019 | Watson et al. | |
| 2019/0188694 A1* | 6/2019 | Uppalapati | G06Q 20/12 |
| 2019/0384896 A1* | 12/2019 | Jones | G06F 21/31 |
| 2024/0046276 A1* | 2/2024 | Varma | G06Q 20/4016 |

* cited by examiner

ENCAPSULATION OF PAYMENT ACCOUNTS WITH TOKENIZATION

CROSS REFERENCE TO RELATED APPLICATION

This patent application claims priority to and is a continuation of U.S. patent application Ser. No. 16/145,072, filed on Sep. 27, 2018, which is hereby incorporated in its entirety by reference.

BACKGROUND

In payment processing, a customer can store payment instrument data such as credit card credentials within a merchant database or another secure server accessed by a merchant via "card on file" functionality. This allows customers to make purchases without the need to enter and re-enter their credit card credentials for each transaction. A primary benefit of offering this option to customers is for convenience and ease-of-use for both customers and merchants.

Storing credit card and other financial information and processing payments internally, however, can necessitate infrastructure and security requirements that may be impractical for some merchants. Third-party payment processing servicers can provide payment processing as a service to merchants. With data security concerns, payment processing can still be complex and cumbersome, which may diminish customer experience when making purchases and performing other transactions.

BRIEF DESCRIPTION OF THE DRAWINGS

The above and other features of the present disclosure, its nature and various advantages, will be more apparent upon consideration of the following detailed description, taken in conjunction with the accompanying drawings in which.

In the figures, the left-most digit(s) of a reference number identifies the figure in which the reference number first appears. The use of the same reference numbers in different figures indicates similar or identical items or features. The drawings are not to scale.

DETAILED DESCRIPTION

Figure 1:
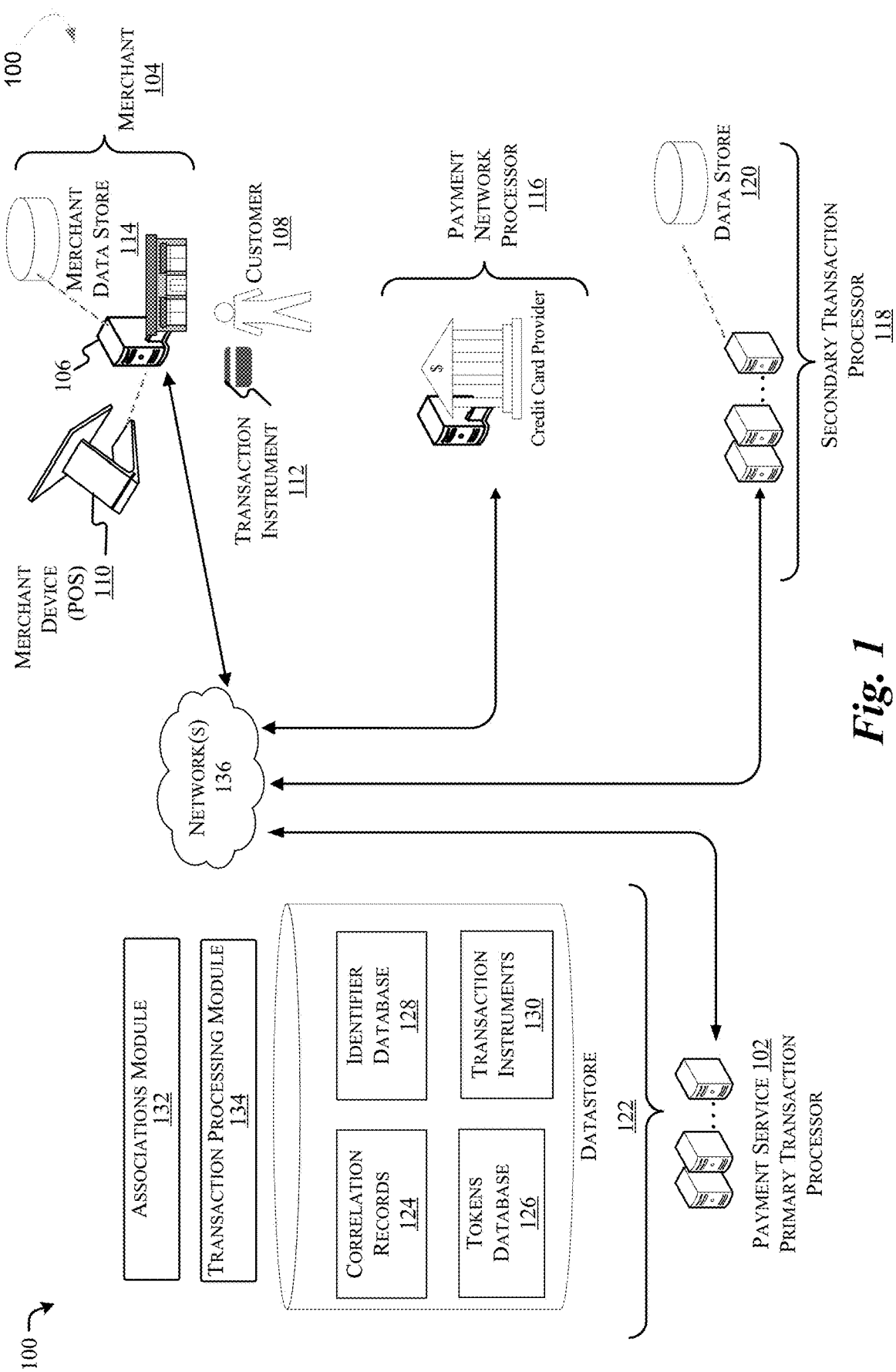
FIG. 1 illustrates an example system that implements techniques for encapsulating transaction instrument data using tokens according to one or more embodiments.

Lessening the complexity of payment processing, money transmission license, and other processing payment infrastructure may be beneficial to merchants and customers. While payment processing complexity has increased as an answer to security concerns, regulatory compliance, and user convenience, this complexity may be a hinderance for some merchants to manage their own payment processing. A merchant may have to staff transaction processing experts, and add technology improvements such as payment processing infrastructure including hardware, software, and network connectivity. If an organization desires to store financial instrument information such as credit card numbers for future customer purchases, the roadblocks may be even more complex.

Storing payment account numbers for use in future transactions may implicate heightened levels of security and regulatory requirements. Some businesses may use third-party payment processors to manage payments from their customers, in place of adding the infrastructure described above. When transaction information is received by the payment processors, the processor may communicate stored payment account information to the merchant during transactions. As a security measure, when communicating payment account data such as credit card numbers to the merchant, the third-party transaction processors may replace payment account numbers with tokens that uniquely map to the respective payment account numbers, in order to avoid subjecting merchants and their customers to security risks associated with transmitting payment account numbers directly.

Payment Tokens can take on a variety of formats across the payments industry. The term network token may refer to a surrogate value for a primary account number (PAN). In some cases, the network token may be a 13 to 19-digit numeric value. Other configurations are contemplated, including tokens that include fewer or more digits than those described herein. Network tokens are generated within a BIN range that has been designated as a Token base identification number (BIN) range and flagged accordingly in appropriate BIN tables. Payment Tokens typically do not have the same value as or conflict with a real PAN.

Tokens may originate from various token providers, and may be used in different ways, depending on the source of the token. For example, a payment network token that originates from a branded payment network (e.g., MasterCard®, VISA® Discover®, etc.) may have security aspects that limit their use, such as time-limited cryptograms associated with the token. As sued herein, a cryptogram is a numeric value that is the result of data elements entered into an algorithm and then encrypted. Cryptograms are used to validate data integrity.

In other aspects, a payment processor offering payment processing services to merchants may issue their own tokens to avoid payment network limitations associated with payment network-provided tokens (such as cryptograms). One downside to this approach, however, is the payment-processor token (or alternatively, a non-network token) may only be used with the transaction processor that issues the token, and with other entities working closely with or functioning as part of the token issuer. That is, the non-network token that is issued by a payment processor may not be extensible for use with other processing entities, whereas the network-provided token may be widely usable for substantially all payment processors.

There is a balance to be struck between security concerns that may be answered by use of tokens, and the convenience of using stored PANS in a card-on-file scenario. Digital storage of financial instruments at a merchant site (such as credit card numbers, for example) can provide value to customers by making subsequent purchases simple and convenient. Although management of the payment instruments requires regulatory compliance throughout the entire chain of transaction, when a compliant entity stores the payment instrument in a card on file scenario, the PANS are extensible in that they may be used with any payment processor, shared with authorized entities, and not limited to a particular processor, such as schemes involving processor-provided tokens.

As explained above, however, on-site storage of financial instruments can be challenging for some merchants due to the security and processing requirements to meet industry standards. Tokens that stand in place of a financial instrument may be more secure than storing credit card numbers. However, conventional tokenization schemes are of limited use for card-on-file applications, because the network tokens are issued in limited numbers and with limited timespans for use after issuance. From a technical standpoint, the limitations of conventional network-provided tokens schemes, as discussed above, can render network tokens, at times, impractical for use as a stored payment method for repeat shopper transactions.

Accordingly, to address these technical problems, it may be beneficial to combine extensible network tokens with payment processor-provided tokens, such that a merchant that uses a third-party payment processor can benefit from the extensibility of a network token while avoiding the time-related limitations of network-provided tokens. In some aspects, it may also be beneficial to avoid the time-limited cryptograms associated with network-provided tokens so that tokens can be stored by businesses, and shared among authorized entities (for example, issued from the merchant to another authorized merchant), and used multiple times by authorized parties. As will be described hereafter with respect to embodiments of this disclosure, the processor-provided tokens may be safely stored by merchants instead of credit card numbers to provide card-on-file functionality, while maintaining the security and extensibility of network-provided tokens.

A payment processing system may be implemented as a network-based service that receives information from merchant point-of-sale (POS) devices to conduct purchase transactions based on payment instruments provided by customers. Payment instruments may include credit cards, debit cards, gift cards, electronic tokens, and so forth. A POS device may perform a transaction involving a payment instrument by sending one or more authorization requests to the payment processing system, followed by a capture request. Each authorization request specifies a payment amount for approval by the issuer of the payment instrument. The capture request triggers the transfer of funds from the customer to the merchant.

In order to provide services for a large number of merchants, the payment processing system may be implemented by servers at geographically dispersed data centers. When requesting services, a POS device may select from any of the data centers, and may send transaction requests to the data centers. The payment processing system may also be implemented by a primary processing service, and at times, a secondary processing service that functions as a backup in case the primary service becomes unavailable or unreachable by a merchant for a transaction.

In conventional transaction processing scenarios, the PAN may be transmitted from the POS device to a payment processor, or the payment processor collects the PAN from the customer directly via an inline frame or other technology. In some scenarios, the primary transaction processor authenticates the payment instrument, then tokenizes the PAN with a digital signature that is recognizable by the payment network. The digital signature generally includes a cryptograph issued by a token provider (which may be the payment network itself, or another token provider). When the primary payment processor signs the token with the cryptogram, under normal circumstances, the payment network receiving the transaction request will see the signed token as a recognizable combination of a digital signature and corresponding PAN, and approve the transaction. An unsigned token would not be recognized by the payment network and would be declined as an unauthorized transaction.

In some situations, the primary transaction processor may not be available, and the transaction information is forwarded instead to the secondary transaction processor. Since the secondary processor may be set up to function as the backup transaction processor, in most cases the secondary processor may not have a stored cryptogram to sign the token and forward to the payment network for transaction approval. Consequently, the secondary processor must fetch a new cryptogram from a token provider at each new transaction. It can benefit the customer and merchant to simplify the transaction dataflow.

In one example embodiment, a first transaction may route transaction information from a merchant POS device to the payment service (also referred to hereafter as the primary transaction processor), where a cryptographic request is generated by the primary transaction processor and forwarded to the network processor to obtain a transaction approval based on the credentials received (or retrieved) as part of the transaction information. An authorization message (which may be a transaction package) may be received from the payment network processor responsive to an affirmative transaction approval by the payment network. The transaction package can include a cryptograph and a network token. In some aspects, the primary transaction processor may generate a second token that is associated with the transaction instrument used to initiate the transaction. The second token, that is generated by the primary transaction processor, may include a merchant-changeable alpha-numeric string as part of the token data. The changeable alpha-numeric string may be overwritten by an authenticated user (e.g., the primary transaction processor, an authorized merchant, or another trusted party) to include encoded information associated with the source of a transaction. For example, a source of a transaction may be a cardholder, where the cardholder initiates a transaction. Another source of a transaction may be a merchant, where the merchant has initiated the transaction.

The source of the transaction may be indicative of a relative risk associated with processing and approving the transaction without benefit of a network-provided cryptograph. For example, a merchant-initiated transaction may be indicative of a higher level of inherent integrity for the transaction, because the merchant is known to the payment network, the primary transaction processor, and the secondary transaction processor. Because the merchant and the parties receiving any transaction request originating from the merchant have prior and repeated business together (from prior transactions processed) the merchant-initiated transaction can be trusted if the changeable alpha-numeric portion of the token indicates that the transaction originated from a trusted source. On the other hand, a cardholder may not be as recognizable because the person initiating the transaction, when a cardholder, may or may not be the authorized cardholder holding the payment instrument. In other words, cardholder-initiated transactions benefit from a heightened level of security provided by a network token signed by a single-use cryptogram that originates from the payment network.

In another example, the primary transaction processor may wish to encapsulate the transaction instrument (for example, the credit card number or other information) by generating a secondary token, and associating the transaction instrument with the secondary token such that there is a one-to-one relationship between the transaction instrument and secondary token. In one aspect, the primary transaction processor may discard the transaction instrument data (e.g., the credit card number) after receiving the payment instrument data and forwarding the transaction information to a token provider, such as a secondary transaction processor or the payment network.

In one aspect, the primary transaction processor stores a correlation record indicative of the relationship between the PAN and the second token. The primary transaction processor may provide the network token and the secondary token to the merchant, where the network token is usable for the immediate transaction, and the secondary token may be used for future transactions in place of a stored PAN. This may have the effect of protecting the merchant, the primary transaction processor, and the cardholder from unauthorized transactions that could originate from misappropriation of a PAN that was used by an unauthorized party. Moreover, the merchant may benefit from a card on file functionality without triggering the infrastructure and processing requirements associated with storing actual credit card numbers on file for repeated cardholder purchases.

In another example, after making a cryptograph request from a token provider, and after receiving an authorization that includes a cryptographic network token, the primary transaction processor may store the received network token in a network token database accessible by the primary transaction processor. In one embodiment, the primary transaction processor tokenizes the network token to create a second token. In this example, the second token is a tokenized token that uniquely points to the network token. The network token may be stored by the primary transaction processor in the network token data store, and a tokenized network token (the second token) may be sent to the merchant for storage in a merchant-accessible database. The tokenized token is then usable by the merchant in the same manner as a network token, with the exception that the tokenized token no longer needs a cryptogram to be accepted for a transaction approval.

Additionally, the second token may be granted by the merchant to another authorized user such as a partner merchant, and that partner merchant can initiate transactions using the second token with the primary transaction processor. In this example, the second token, which points exclusively to the network token that is stored in a datastore and accessible only by the primary transaction processor, now has limited extensibility within a predetermined network of merchants under the umbrella of the primary transaction processor. This has the technical effect of increasing usability of the merchant-stored token, while still providing a card-on-file functionality in a limited network of authorized parties.

In another example, after receiving the cryptograph and network token from the token provider, the primary transaction processor may store the pan in a datastore that is accessible by the primary transaction processor. The primary transaction processor may then create a second token having a one-to-one relationship with the stored pan. The one-to-one relationship is stored as a correlation record in a correlation record database accessible by the primary transaction processor. Accordingly, in this example embodiment, the primary transaction processor may forward the second token and the network token to the merchant server. The merchant server may store the second token in a token datastore accessible only by the merchant server, and use the network token (signed with a cryptograph) for the immediate transaction. In future transactions where the same credit card or other financial instrument is tendered, the merchant may use the tokenized network token as an extensible copy of the network token. Accordingly, the primary transaction processor may receive the tokenize network token from the second merchant, access the correction record that associates the pan with tokenize network token, and forwarded the network token to the payment network processor to obtain transaction confirmation.

This example provides the technical effect of providing an extensible token that may be granted between authorized merchants, used with any transaction processor. This example has the further effect of providing a card on file functionality for repeat transactions by the cardholder, but with a tokenized proxy for the stored financial instrument information. The tokenized token is stored by the merchant for later use as a proxy for a card on file, without having the infrastructure required for a card on file delivery system. Moreover, this example provides the benefit of the tokenizing a network token such that it maintains aspects of usability without time-related expiration limitations associated with network provided cryptographs.

Furthermore, techniques described herein are directed to improvements to point-of-sale (POS) technology. For instance, techniques described herein are directed to improvements to the reader device as card-on-file extensions described herein alter the standard payment flow. That is, by novel applications of cryptographic security measures, the reader device need not read and transmit payment data to payment networks for every transaction to obtain cryptograms for every transaction. By combining payment instrument tokenization in new ways, such as tokenizing a network token and creating a unique string of data on a portion of an overwritable token that identifies the source of a transaction, standard payment processing dataflows may be simplified by omitting the back-and-forth transmission of cryptograph requests, secondary authentication, etc. The amount of data sent and received between merchants, primary payment processors, secondary payment processors, and payment networks is reduced, which can speed transactions and enhance security and convenience to users.

Moreover, technologies described herein can also increase reliability of processing systems by allowing transactions to be processed by secondary payment processors in a seamless fashion should the primary payment processor become unavailable for merchant communication. That is, in some cases, the network token may be omitted and the transaction may be authenticated using information in the authorization request including a processor-changed alphanumeric string in the secondary (non-network) token. Accordingly, techniques described herein are directed to unconventional techniques for reducing network congestion and increasing bandwidth.

According to other aspects of the present disclosure, it can be advantageous to provide a computing environment that unifies an online, mobile app, and in-person payments experience connecting merchants and buyers. For example, it can be advantageous to power transactions in all channels through a single provider, enabling a consistent payments experience and seamlessly unifying sales and customer data across the system. The systems described herein provide an end-to-end platform for making and receiving payments in a marketplace, including onboarding new merchants to the system, account creation, transaction processing, generating data and reporting, and payouts transferring funds to and from merchants.

For example, with respect to creating, verifying and managing customer accounts, in one embodiment, the system programmatically creates accounts for distributers, merchants, and other identities on the marketplace (contractors, etc.), via an accounts application programming interface (API). The system may associate merchant accounts with a marketplace account, or may group accounts together according to merchant-configurable group settings. By way of example, to create and activate a seller account the system may create a seller account using an account creation endpoint. A merchant may collect information for verification, where each new account defaults to an unverified entity that represents an individual or business owner behind the seller account. Accordingly, in one aspect, the new account is strengthened because the legal entity is verified to match a proper legal entity to the person associated with the account. The verification information is submitted by the merchant to initiate the verification process.

In other aspects, the accounts API may facilitate creation of merchant accounts. To activate a seller account, the system that facilitates the account creation may benefit from verification of the legal entity. The verification process for legal entities may be substantially instantaneous, in some aspects of the present disclosure. For example, merchant accounts may contain all the information related to an entity and may include API calls that facilitate association of the merchant accounts with the legal entity. A bank accounts API may link seller bank accounts to seller accounts. Developers can also link associated accounts, and customize permissions to enforce the desired groupings and structures, according to an embodiment.

According to an embodiment, a legal entity represents the individual or business owner that backs a merchant account. A legal entity can include details about the individual receiving payments and enable procedures to limit fraud and risk. In one aspect, the system may perform identity verification via one or more identity verification APIs, to meet compliance and regulatory checks before activating merchant accounts for payments. In some respects, the platform can onboard merchants to the platform by programmatically creating merchant accounts the via an API, and associate sub-merchant accounts to the primary merchant account.

In other aspects, and as described above, the system can take payments and other transactions using a customizable user interface that associates orders, buyers, products, and other criteria with the tokens and card-on-file information as described above. The system, using a cards API, may create and manage saved buyer credit/debit cards for a card-on-file functionality. According to an embodiment, the system can manage funds by splitting revenue across parties, and implement fee-sharing logic. For example, order and payment flows may reimburse sub-merchants for discount or gift card redemptions. Benefits to merchants can include gathering bank account data with enhanced security measures, such as payouts via APIs, creating balances for funds until payout, and settlement on-demand. For example, some aspects of embodiments described herein may enable marketplaces to programmatically create accounts, for themselves, their merchants, and other identities on the marketplace (e.g., sub-merchants, contractors, etc.). APIs can perform identity verification to enhance security and maintain regulatory compliance before activating new merchant accounts for payments. In other embodiments, accounts can be associated with a marketplace account or grouped together in whatever configuration makes sense for a merchant's business model.

With respect to taking payments, embodiments of the present disclosure describe a platform that accepts funds and initiates refunds online, in-app, and in-person within their product experience. Via a payments API, the system can take and process payments on behalf of merchants. With enhanced connectivity between merchants and marketplace payment management systems, cumbersome compliance mechanisms associated with current payment platforms can be avoided, such as, for example, self-assessment questionnaires and third-party assessments. For online and mobile application payments, the system may collect card data via secure hosted fields. An exemplary processing of a payment may include, for example, sending a payment request for a sub-merchant account to an endpoint. A payment creation API may request a source identification that identifies the payment source, and identify the seller account for receiving funds.

The system may match between payment source and payment account using payment configurations. In one embodiment, payment configurations are a collection of parameters that control payment behavior, and can be referenced in a payment creation request. By default, the system, via the payment API, may use the payment configuration created automatically with the merchant account. However, in other aspects, the system may reference a custom payment configuration when making payments.

In an embodiment, managing funds in the marketplace is enhanced. For example, in one embodiment, marketplace users of the system may have two options for managing revenue sharing with merchants. One option enables a platform to split funds between the primary account and sub-accounts via an API, at the time of payment. Marketplaces can create and configure per payment fees for their merchants. Post-split, funds may be held in a digital wallet, or balance, for each account until the time of payout. A second option enables greater flexibility for more complex money movement, such as, for example, when the amount of a split payment is not known at the time of payment or the marketplace needs to make a transfer of funds that is not attached to a specific payment. For example, a deposits API can initiate transfers from a merchant's account balance to a linked bank account.

In one aspect, a multiparty transaction describes a marketplace payment processing where the primary payment processor credits a portion of the total payment amount to a developer account balance, and the remaining payment amount is credited to the seller account balance. For example, a balance API may retrieve account balance information for any merchant account. Multiparty transactions may be preferred when the split amount is known at the time of payment because the system automatically splits funds across all participating parties. In an embodiment, the system may support multiparty transactions with varied fee logic (such as, for example taking 1% fee on a first type of transaction, and taking a 5% on a second type of transaction). Other amounts are contemplated. According to an embodiment, funds can be placed into balances, from which a marketplace user can elect to settle to a linked bank account on a user-selectable schedule, via an API. Once a payout is initiated, the payment can settle to the bank account within 1-2 business days.

Risk management is an important concern when creating financial services platforms. In some situations, merchants may have to navigate unscrupulous buyers that make purchases and dispute valid transactions after making a purchase. Aspects of the present disclosure may facilitate merchant data sharing and collaboration via an API with banks or other entities to counter invalid disputes.

Risk management may be enhanced with security and risk management models that are part of a centralized system, according to an embodiment. One embodiment provides for security and risk management models configured to analyze transaction information from a vast payments ecosystem. Accordingly, the system may identify fraudulent activity before the fraudulent activity happens. For example, in an embodiment, the system may provide a risk score for each transaction, giving marketplaces visibility into a relative riskiness of transactions coming through their platform. Aspects of the present disclosure may also provide merchant-configurable controls that to allow the merchant more control above and beyond standard risk modeling infrastructure.

Additional details and scenarios are described below. This brief introduction is provided for the reader's convenience and is not intended to limit the scope of the claims. Furthermore, the techniques described above and below may be implemented in a number of ways and in a number of contexts. Several example implementations and contexts are provided with reference to the following figures, as described below in more detail. However, the following implementations and contexts are but a few of many.

FIG. 1 shows an example computing environment 100 that implements techniques for encapsulating financial instrument data for merchant customers of a payment service 102. The payment service 102 may communicate with a merchant a merchant 104 (and more particularly, a merchant server 106) offering goods and/or services to a customer 108. The merchant 104 may control and/or operate the merchant server 106. The merchant server 106 may include one or more merchant device(s) 110 referred to herein as a point-of-sale (POS) that may receive transaction instruments such as, for example, the transaction instrument 112 associated with the customer 108. The payment service 102 provides purchase transaction support to the merchant 104, and thereby enables and facilitates payment processing for point-of-sale (POS) transactions between the merchant 104 and the customer 108. The merchant server 106 may be in communication with a merchant datastore 114, that may store transaction information, tokens, cryptograms, or other data.

The term "merchant" as used herein may include any business engaged in the offering of goods or services for acquisition by customers. Actions attributed to a merchant may include actions performed by owners, employees, or other agents of the merchant and thus no distinction is made herein unless specifically discussed. In addition, as used herein, the term "customer" or "cardholder" includes any entity that acquires goods or services from a merchant, such as by purchasing, renting, leasing, borrowing, licensing, or the like. Hereinafter, goods and/or services offered by merchants may be referred to as items. Thus, a merchant and a customer may interact with each other to conduct a purchase transaction in which the customer acquires an item from a merchant, and in return, the customer provides payment to the merchant. As used herein, the term "purchase transaction" includes a financial transaction for the acquisition of items (goods and/or services) that is conducted between a customer and a merchant, including the rental, leasing, borrowing, licensing, etc. of items. A merchant may offer goods and services online, in a brick-and-mortar location, and/or a combination of online and brick-and-mortar location. For example, a merchant may be an online marketplace, an online retail outlet, a website, a store location in a shopping center, an individual offering goods and services in person, etc.

The computing environment 100 further includes a payment network processor 116, which may be a named credit card provider network (e.g., MasterCard®, VISA® etc.). The payment network processor 116 may approve or reject transactions forwarded to them by a payment service. The payment network processor 116 may be an issuer of tokens used in payment processing, or may use a third party as a token issuer. A transaction that originates or flows through any part of the computing environment 100 is also said to be a marketplace transaction. Marketplace payment management systems, as used herein, may be any payment management system functional as part of the computing environment 100.

The computing environment 100 further includes a secondary transaction processor 118. The secondary transaction processor 118 may serve as a secondary payment service that supports the payment service 102 by processing transactions if the payment service 102 is unavailable or unreachable by the merchant 104. The secondary transaction processor 118 may include one or more secondary processor datastores 120 configured to store transaction information and other information, such as, for example, network tokens, records that correlate transaction instruments with particular tokens, PANS, etc., and other information. In some scenarios, the secondary transaction processor 118 may also be a token provider. In other aspects, the secondary transaction processor 118 may obtain tokens from another authorized source.

The payment service 102 may communicate information to and from the merchant server 106, the payment network processor 116, and the secondary transaction processor 118 through one or more networks 136.

The payment service 102 may include payment processing software, hardware, and/or services that enable a merchant to receive payments (e.g., transaction instrument 112) from customers when conducting POS purchase transactions with the customer 108. For example, the payment service 102 may enable the merchant 104 to receive credit card payments, debit card payments, mobile payments, and/or different types of electronic payments from customers. Although visually depicted as a credit card, the transaction instrument 112 may take any form of transaction instrument.

One or more servers 103 of the payment service 102 interacts with multiple POS computing devices (such as, for example, the merchant device 110). The POS computing device 110 (also referred to herein as merchant device 110) may be associated with merchant, a such as the merchant 104. The POS devices are used by the merchant 104 to process payments for purchase transactions from customers. Generally, the POS devices 110 may include any of various types of devices, such as terminals, computers, portable devices (tablet computers, smartphones, etc.) and so forth. In some cases, the POS devices 110 may incorporate or work in conjunction with a card reader for reading credit cards and/or other payment instruments. In some cases, the POS devices 110 may enable mobile payments, such by allowing a customer to use a smartphone or other mobile device to pay for a purchase transaction. More generally, a POS device is configured to receive information from a payment instrument, which may comprise a physical card or an electronic token or data object, and to interact with bank-related services to facilitate the transfer of funds from the customer to the merchant based on the information from the payment instrument.

The customer 108 pays for a purchase transaction by providing the transaction instrument 112 such as a debit card, a credit card, a stored-value or gift card, a check, an electronic token provided by a device carried by the customer, etc. The merchant 104 can interact with the POS device 110 to process the transaction, such as by inputting an identifier associated with the payment instrument (e.g., manually, via a magnetic card reader (not shown) or an RFID reader (not shown), etc.). For example, the transaction instrument 112 of the customer 108 may include one or more magnetic strips for providing card and customer information when swiped in a card reader. In other examples, other types of payment cards may be used, such as smart cards having built-in memory chips that are read by the POS devices 110 when the cards are "dipped" into the reader, radio frequency identification tags, and so forth. The merchant 104 and/or the POS device 110 may also provide other information describing the transaction, such as a payment amount, the item(s) being purchased, a time, place and date of the transaction, a card network associated with the payment instrument, an issuing bank of the payment instrument, and so forth.

Although FIG. 1 shows only a single POS device 110 associated with a merchant 104, it should be appreciated that the computing environment 100 can include any number of merchants, and a merchant may include any number of merchant devices. Accordingly, the merchant 104 is referred to as "merchant 104" or "merchants 104" where any of the merchants may use multiple POS devices that are part of an integrated POS system that can include the POS devices 110, the one or more merchant servers 106, and the merchant datastore 114. Furthermore, the POS devices 110 of the merchant POS system may be used interchangeably during a purchase transaction. That is, a transaction may be initiated on one POS devices 110 and completed on another POS device (not shown). Thus, although the following description assumes that a transaction is completed using a single POS device, several different POS devices of the merchant 104 may in fact be used over the course of a single purchase transaction. Furthermore, the actions that are described herein as being performed by a POS device may in certain implementations be performed by a POS system including the merchant server 106, of which the POS device 110 is a part.

The payment service 102 may include a datastore 122 operatively connected to the merchant servers 106. The datastore 122 stores information for transaction processing and performing other aspects of embodiments described herein. For example, the datastore 122 can include correlation records datastore 124, an identifier database 128, one or more token databases 126, and a database for transaction instruments 112. Each of the databases of the datastore 122 are discussed in greater detail throughout the following sections.

The payment service 102 communicates with the payment network processor 116 to conduct purchase transactions electronically on behalf of the merchant 104. For purposes of discussion, the payment network processor 116 represents one or more card payment networks (e.g., MasterCard®, VISA®), issuing banks, acquiring banks, and other entities, banks, or institutions that may be involved in processing payment transactions and electronically transferring funds between merchants and customers.

The payment service 102 may be a large-scale service that supports many merchants, such as the merchant 104, who may be distributed across large geographic areas. In some cases, the payment service 102 may implement POS services through pages of a website that are accessed by the POS device 110 of the merchant 104. In these cases, the POS devices 110 may comprise devices such as tablet computers or other portable devices that access the pages of the website using an Internet browser. In other cases, tablet computers or other devices may run special-purpose applications that are specifically configured to implement POS services in conjunction with the payment service 102, using network APIs (application program interfaces) that are made available by the payment service 102.

The payment service 102 may perform functions and processes described herein using software and hardware modules. The server(s) 106 associated with the payment processing service can be configured to, among other things, process payments between merchants and customers. In at least one example, the server 106 can include an associations module 132, an identifier database 128, and a transactions processing module 134.

The associations module 132 can facilitate associating entities such as, but not limited to, identifiers (associated with payment objects) with payment data (associated with payment instruments). Resulting associations (e.g., mappings) can be stored in the identifier database 128. That is, the identifier database 128 can store associations between identifiers and payment data. Additional details associated with the associations module 132 are described below. The associations module 132 may also correlate network tokens issued by the payment network processor 116 (or another token provider) with non-network tokens such as those generated by the payment service 102. Resulting mappings may be stored in the correlation records datastore of datastore 122.

The transaction processing module 134 can receive transaction data and process transactions based at least in part on the transaction data and payment data. Additional details associated with the transaction processing module 134 are described below.

To efficiently serve large numbers of geographically dispersed merchants, the payment service 102 may be implemented by servers of one or more data centers. Each data center may be a facility in a different geographic location that houses redundant computing equipment and software to support the operations and services of the payment service 102. An individual POS device (e.g., merchant device 110) may communicate with servers at any one of the data centers to process payment transactions. The POS devices 110 may communicate with the data centers of the payment service 102 through a network infrastructure (e.g., a network 136) such as the Internet. More generally, the network 136 may utilize local area networks, wide area networks, wired networks, Wi-Fi and other wireless networks, cellular data networks, close-range wireless communications such as Bluetooth®, near field communications (NFC), etc. Protocols for communicating over such networks are well known and will not be discussed herein in detail. The same or similar communication technologies may also facilitate communication between the payment service 102 and the payment network processor 116. Various types of encryption and security techniques may be employed to protect communications from eavesdroppers.

Figure 2:
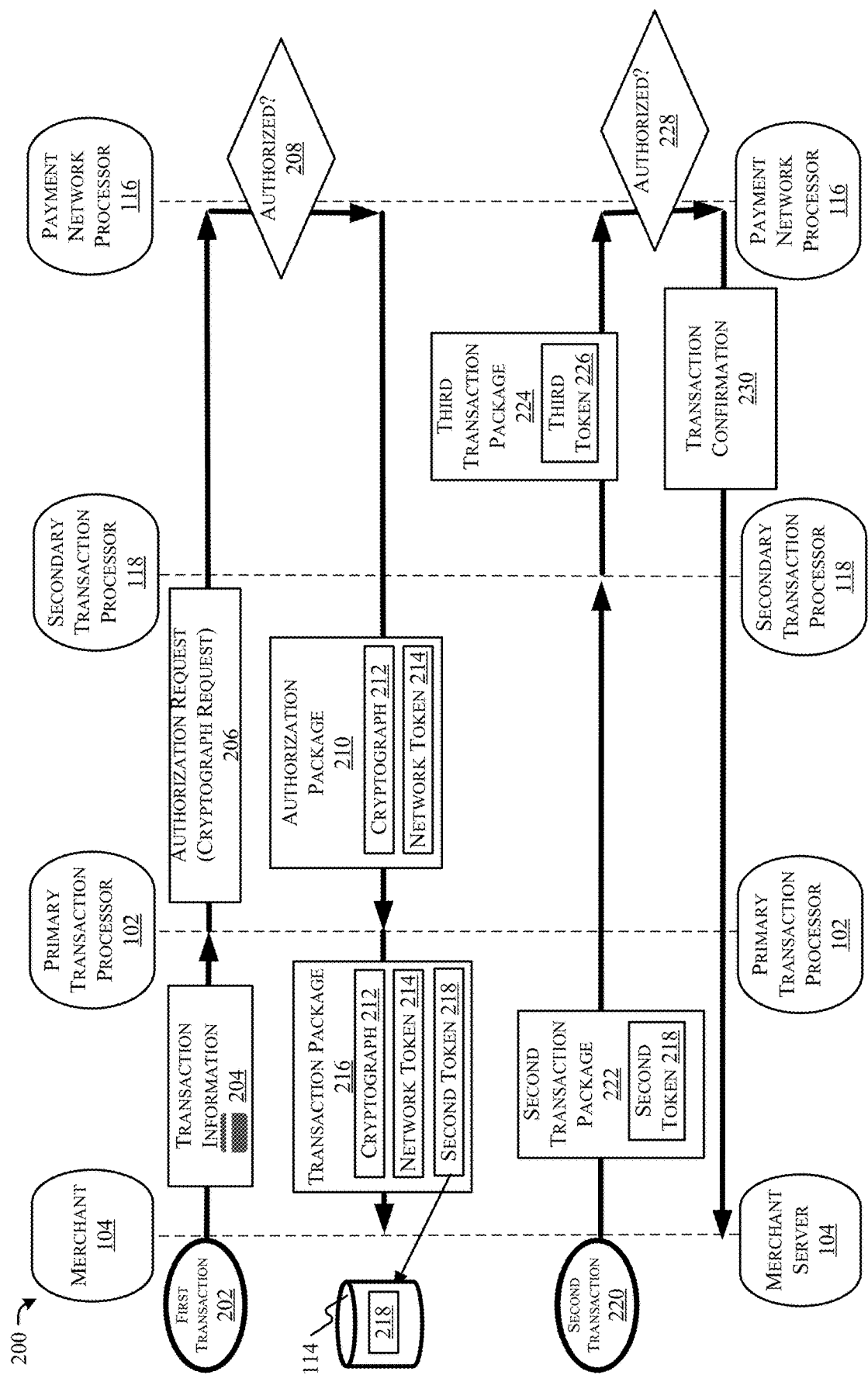
FIG. 2 is a flow diagram illustrating example communications within the system of FIG. 1 according to an embodiment.

FIG. 2 illustrates data flow for communications that may take place in example payment transactions implemented by the payment service 102 and an individual POS device 110

(referred to in the following examples generally as the merchant 104. In this example, the payment transaction is conducted in two phases: authorization and capture. This authorization/capture type of payment transaction is frequently used in service settings such as restaurants, where the merchant preliminarily authorizes a payment amount that is subject to subsequent adjustment for tips, additionally ordered menu items, and so forth. In the authorization phase, the merchant obtains an authorization for the payment amount. In the capture phase, the merchant submits a capture request to finalize the transaction and to initiate appropriate funds transfers.

As previously discussed, it is advantageous to provide a method for encapsulating payment instrument information for secure transactions that reduce inherent risk associated with storing, sending, and receiving primary account numbers, credit card information, and other sensitive data that may be misappropriated by a bad actor. It is also advantageous to create a system for providing backup transaction processing using a secondary transaction processor, where a tokenized version of card on file system may be authenticated by the secondary transaction processor, and ultimately, the payment network processor. In the following example embodiments, a first transaction is followed by a second transaction, where the second transaction is initiated by the same customer using the same transaction instrument (e.g., credit card or other instrument).

As shown in FIG. 2, a first transaction 202 begins the process. A transaction begins when a merchant 104 specifies a preliminary payment amount for the transaction. The preliminary payment amount may be entered manually by the merchant using the POS device 110 (FIG. 1) or may be generated automatically by a POS system of the merchant 104 based on prices of purchased or ordered items. Upon being presented with the preliminary payment amount, the customer (e.g., customer 108 as shown in FIG. 1) presents a payment instrument 112. The payment instrument 112 may comprise a credit card, a debit card, or a similar instrument. In some cases, the payment instrument may comprise an electronic token provided wirelessly by a mobile device, such as when using mobile or cardless payments.

Based on the presented payment amount and payment instrument, the merchant 104 (and more particularly, a POS device such as the merchant device 110 depicted with respect to FIG. 1) sends an authorization request to the payment service 102 (generally referred to hereafter as the primary transaction processor 102). In other aspects, the primary transaction processor 102 may retrieve the transaction instrument 112 information via an inline frame operating as part of the merchant application (e.g., the merchant application 714 discussed hereafter with respect to FIG. 7) of the merchant device 110. FIG. 2 contemplates either case, where the transaction information 204 is received by the primary transaction processor 102.

The transaction information 204 may include various information that may be used by the payment service 102 and in turn by the payment network processor 116, to obtain authorization for the payment amount. The information may include the payment amount as well as payment instrument details such as credit card information. In some aspects, as depicted in FIG. 2 with respect to the second transaction 220, the secondary transaction processor 118 may receive the transaction information in place of the primary transaction processor 102. In other aspects, the secondary transaction processor 118 may work in conjunction with the primary transaction processor 102.

The authorization request 206 may include data such as a credit card number, a security code, an expiration date, and so forth. In addition, the authorization request 206 specifies a transaction identifier (ID) that is unique to the purchase transaction of which the specified payment amount is a part. In addition to uniquely identifying the purchase transaction, the transaction ID may also uniquely identify the POS device 110 and/or the merchant 104 who is submitting the authorization request 206.

In response to receiving the transaction information 204, the primary transaction processor 102 may provide payment instrument information, such as information identifying the transaction instrument 112, to a credit card processing network (e.g., the payment network processor 116) to obtain an approval for the authorization request 206. The primary transaction processor 102 may also perform its own risk analysis to determine whether to approve the authorization request 206. The authorization request 206 may also include other information that is not shown in FIG. 2, such as the approved payment amount, the transaction ID, an authorization number for the payment amount, etc.

The payment network processor 116 authorizes or declines the authorization request 206 based on the authorization request 206, as depicted in the authorization decision 208. Responsive to approval by both the payment network processor 116 and the primary transaction processor 102, the payment network processor 116 transmits an authorization package 210 to the primary transaction processor 102. The authorization package 210 can include a cryptograph 212 and network token 214.

Some purchase transactions may include multiple authorizations. This may be the case, for example, when a customer presents more than one credit card for payment of a purchase or when multiple customers split the payment for a purchase transaction. As another example, this may occur when a customer orders additional items after an initial authorization. Purchase transactions that include multiple authorizations may comprise more than one transaction ID, which may be referred to as split tender or multiple tender transaction. In such a case, each authorization may be referred to as a tender. Accordingly, the authorization package may include multiple cryptographs and/or network tokens associated with a corresponding tender.

In conventional use, tokens acceptable by a payment network processor (e.g., a credit card processor or an authorized token provider working with the payment network processor) require an accompanying cryptograph to sign the network token, which may be used to authenticate the token. The authenticated token is used to securely take the place of a primary account number, and is valid generally for a single transaction once signed and submitted to the payment network processor 116. Without the network-provided cryptograph 212, the network token 214 is not accepted by the payment network processor 116 to satisfy payment for a transaction.

The cryptograph 212 and the network token 214 are a single-use package that are also time limited. For example, network-provided cryptographs can have a time limit of 24 hours, 72 hours, etc., after which they must be requested again if they have not yet been submitted by a merchant (and ultimately the transaction processor) to satisfy a transaction. For this reason, among others, storing a network token by a merchant-accessible datastore in place of a card on file may not be convenient or feasible, because the relatively short lifespan of a network token may not be practical.

After receiving the authorization package 210, the primary transaction processor 102 may generate a second token 218 that is associated with the transaction instrument used by the cardholder for the first transaction 202. The second token 218 can be issued by the primary transaction processor 102, and may include a token identification field that indicates the source of a subsequent transaction if the second token were used to satisfy the second transaction. In one aspect, the source of the transaction may be a customer (e.g., a cardholder). In another aspect, the source of the transaction may be a merchant. The source of the transaction may be encoded in a changeable alpha-numeric string associated with the second token. For example, the second token 218 may include an alpha-numeric string that is changeable by an authorized party (such as, for example, the merchant 104) but not changeable by any other party, that can be encoded to include an "m" indicative of a merchant-initiated transaction, or include a "c" for a customer-initiated transaction. In other aspects, the alpha-numeric string may include unique identification information that identifies the merchant 104.

Conventionally, the secondary transaction processor 118 would decline a token that does not include a network-provided cryptograph if it were presented for payment authorization, because the secondary transaction processor does not recognize the authenticated relationship between the unsigned token and the authorized cardholder (and the payment account associated with the authorized cardholder). The secondary transaction processor 118 may not approve the transaction because the source of the transaction is not known absent a network token.

As a solution to this technical problem of conventional token transactions, according to an embodiment, the secondary transaction processor 118 can accept an authorization request with an unsigned token if the token includes information indicative of the source of the transaction. In one aspect, a merchant-initiated transaction may be trustworthy because the relationship between the uniquely-identified merchant and the secondary transaction processor 118 may be sufficient to authenticate the transaction instrument associated with the non-network (second token 218).

In another embodiment, the changeable alpha-numeric string may be issued by the primary transaction processor 102 having a default value indicative of a customer-initiated transaction. Consequently, if the second token 218 were used as tender for a subsequent transaction (that is, subsequent to the first transaction 202) by any party but the authorized merchant 104, the secondary transaction processor 118 would decline the authorization because it is not originated from a trusted source (e.g., the merchant 104).

Referring still to FIG. 2, after the authorization package 210 is received by the primary transaction processor 102, the primary transaction processor 102 may generate a second token 218, where the second token includes a changeable alpha-numeric string associated with the transaction instrument 112 and the first transaction 202. The primary transaction processor 102 may package the cryptograph 212, the network token 214, and the second token 218 into a transaction package 216, and transmit the transaction package 216 to the merchant 104.

In one aspect, the merchant 104 may use the network token 214 signed with the cryptograph 212 to satisfy tender for the first transaction 202. The merchant may then store the second token 218 in the merchant datastore 114 for use in subsequent transactions with the customer 108 (e.g., the second transaction 220), where the same transaction instrument 112 is used for the second transaction.

For example, when the same customer 108 makes a second purchase (the second transaction 220) from the same merchant 104, the merchant may use the stored second token as a card on file for the benefit and convenience of the customer 108. During the second transaction 220, the merchant 104 may transmit the second token 218, which the merchant stored in the datastore 114, as part of a second transaction package 222 having the second transaction information. For example, the second transaction information can include the second token 218, the cost associated with the second transaction, merchant identification information, and other information normally transmitted to a transaction processor. In the event that the primary transaction processor 102 is unavailable to process the second transaction package 222, the secondary transaction processor 118 may receive the second transaction package 222, and authenticate the transaction request based on, among other things, the second token 218 that includes the encoded information of indicative of a customer-initiated transaction or ii) a merchant-initiated transaction.

In one example embodiment, the secondary transaction processor 118 may request a network token from the payment network processor 116 and a cryptogram, and approve the second transaction package 222 for payment. In another aspect, the secondary transaction processor may be a payment network processor, and may approve the second transaction package 224. At the authorization decision 228, the payment network processor 116 approves the transaction using the third token 226, which may be a network-provided token having a cryptogram, and generates a transaction confirmation 230. The payment network processor 116 transmits the confirmation 230 to the merchant 104 to complete the second transaction. The transaction completion may include, for example, generating a transaction confirmation message at the merchant device 110 and outputting the transaction confirmation.

In one embodiment, the second token 218 is not time limited due to cryptogram expiration limitations. Accordingly, the second token 218 may be stored in the merchant datastore 114 for future purchases by the customer 108, while avoiding much of the risk and technical complexity associated with storage of actual card numbers and other financial instrument data in a merchant card on file system.

Figure 3:
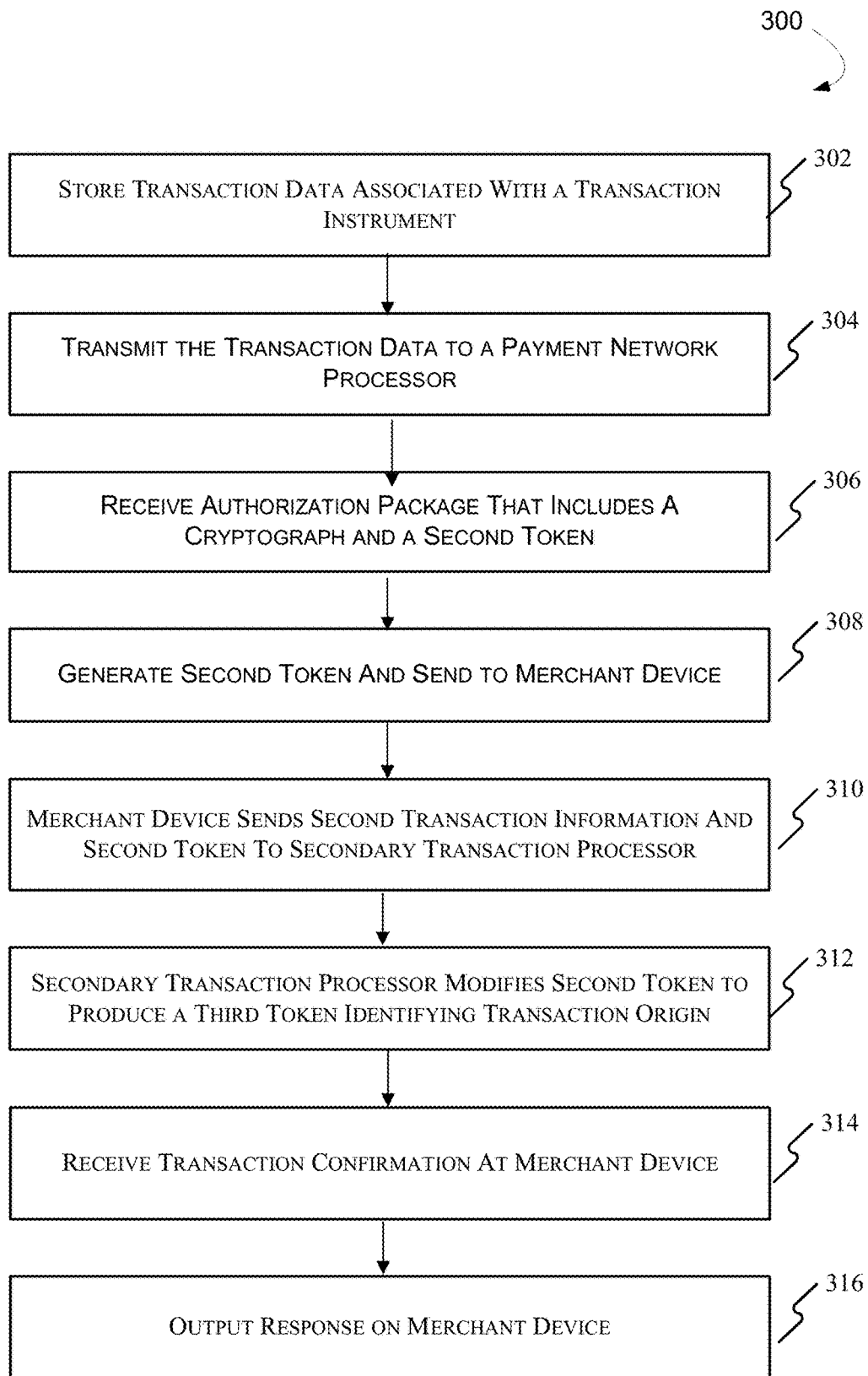
FIG. 3 is a flow diagram illustrating an example method for encapsulating transaction instrument data in a transaction according to an embodiment.

FIG. 3 depicts a flow diagram of a method 300 for encapsulating transaction instrument data for a transaction, according to an embodiment. In an embodiment, the customer 108 may present the transaction instrument 112 to the merchant 104 to satisfy the cost of a transaction. For example, the merchant 104 may read the card number or other identifying data from the transaction instrument 112 using the merchant device 110. As step 302, a processor of the primary transaction processor may store the transaction data associated with the transaction instrument 112. Storing the transaction data may include, for example, saving the transaction data and or the transaction instrument identification information in the transaction instruments datastore 130.

As shown in block 304, the primary transaction processor 102 may transmit the transaction data to the payment network processor 116 to obtain transaction approval. The payment network processor 116 may evaluate the transaction request based on the information included in the transaction data, such as, for example, the financial instrument information that identifies the transaction instrument 112, cardholder information that identifies the customer 108, a personal identification number, a merchant identification, a date, a purchase amount, and/or other information commonly associated with approval of transactions involving financial instruments such as credit cards, and the like.

At step 306, the primary transaction processor 102 may receive an authorization package 210 that includes a cryptograph 212 and a network token 214. At step 308, the primary transaction processor 102 may generate a second token 218 comprising a changeable alpha-numeric string associated with the transaction instrument 112 and the first transaction 202 (that is, associated with the transaction triggering the authorization request 206). The primary transaction processor 102 transmits the second token 218 to the merchant device 110 via the network 136. In one aspect, the primary transaction processor 102 packages the second token 218 with the network token 214 and the cryptograph 212, but does not include the numeric transaction data associated with the transaction instrument 112. For example, in one embodiment the merchant 104 does not have access to the transaction instrument data directly, but instead serves as a conduit for the transaction instrument data to flow to the primary transaction processor 102 via an inline frame operational as part of the merchant application 714 (described in greater detail with respect to FIG. 7).

Accordingly, by not including the numeric transaction data associated with the transaction instrument 112, the customer data may now have enhanced security because the PAN is not handled by the merchant 104 directly during the transaction, and is not stored by the merchant 104. Moreover, in an embodiment, the convenience of maintaining a card on file for repeat transactions by the same customer 108 is maintained using the second token 218, that may be safely stored by the merchant 104 in the merchant datastore 114.

During another transaction involving the merchant 104 and the customer 108 (and more precisely, another transaction where the customer 108 tenders the same transaction instrument 112 that was tendered in the first transaction 202), the customer 108 may now benefit from the convenience of the token-on-file that emulates a card on file. The customer 108 may present the transaction instrument 112 for the second transaction. The merchant 104, who is an authorized party for changing the changeable alpha-numeric string on the second token 218, may overwrite the default value of the string to include an encoding indicative that the second transaction originates from the merchant 104. Accordingly, the processor 704 of the merchant device 110 may save the second token 218 to the computer-readable memory of the POS (merchant device 110), write alpha-numeric character "c", and append the alpha-numeric string to include a unique identification code that identifies the merchant 104.

At step 310, the merchant device 110 sends the second transaction information, including the second token 218, to the secondary transaction processor 118 via the network 136. The second token 218 is now encoded to identify the source of the second transaction 220 associated with the second transaction data. The second transaction package 222 does not include a second cryptograph. Instead, by referencing the source of the transaction (either the merchant or a customer) the second token is encoded by an authorized party (the merchant, e.g.,) to provide information informing the secondary transaction processor 118 of the relative reliability of the second transaction package 222.

The secondary transaction processor 118 may, in some cases, be a network processor 116. That is to say, some credit card processors may issue their own tokens. Accordingly, in one embodiment, the secondary transaction processor 118 need not request a cryptograph to approve the second transaction package, but rather, may approve or reject the second transaction request associated with the second transaction package 222.

In the example method 300, however, the secondary transaction processor is a separate entity from the payment network processor 116. Accordingly, at step 312, the secondary transaction processor 118 may generate a third token 226 that is associated with the second token 218. The third token 226 is associated with the second token 218 in that the third token 226 is generated by the payment network processor 116 responsive to receiving a request for a cryptogram from the secondary transaction processor 118. The secondary transaction processor 118 may receive the second transaction package 222, authenticate the second token 218 based on the information encoded in the token that identifies the source of the transaction, and subsequent to authenticating the second token 218, request a cryptogram from the payment network processor 116 to sign the third token 226. The secondary transaction processor 118 may forward a transaction confirmation response 230 to the merchant server 106, or alternatively (as shown in FIG. 2), the payment network processor 116 may forward the transaction confirmation response 230 to the merchant 104 directly. The transaction confirmation response 230 may include the third token 226, a cryptogram (not shown), or other information indicative of a payment authorization for the second transaction 220.

As shown in block 314, the processor 704 of the merchant device 110 receives the transaction confirmation response 230, and processes the transaction accordingly. At step 316, the merchant device 110 outputs a response indicative of the transaction approval.

The embodiments described with respect to FIGS. 2 and 3 provide, among other technical benefits, a transaction processing backup system that allows merchants to maintain a tokenized card on file that is also extensible in that the transaction processor that is able to process the transaction request using the stored token may be more than a single processor. The extensibility may be limited, however, to the transaction processors aware of the specialized second token. It may be beneficial to increase the extensibility of the second token while maintaining the security of encapsulation of the transaction instrument 112 through tokenization.

Figure 4:
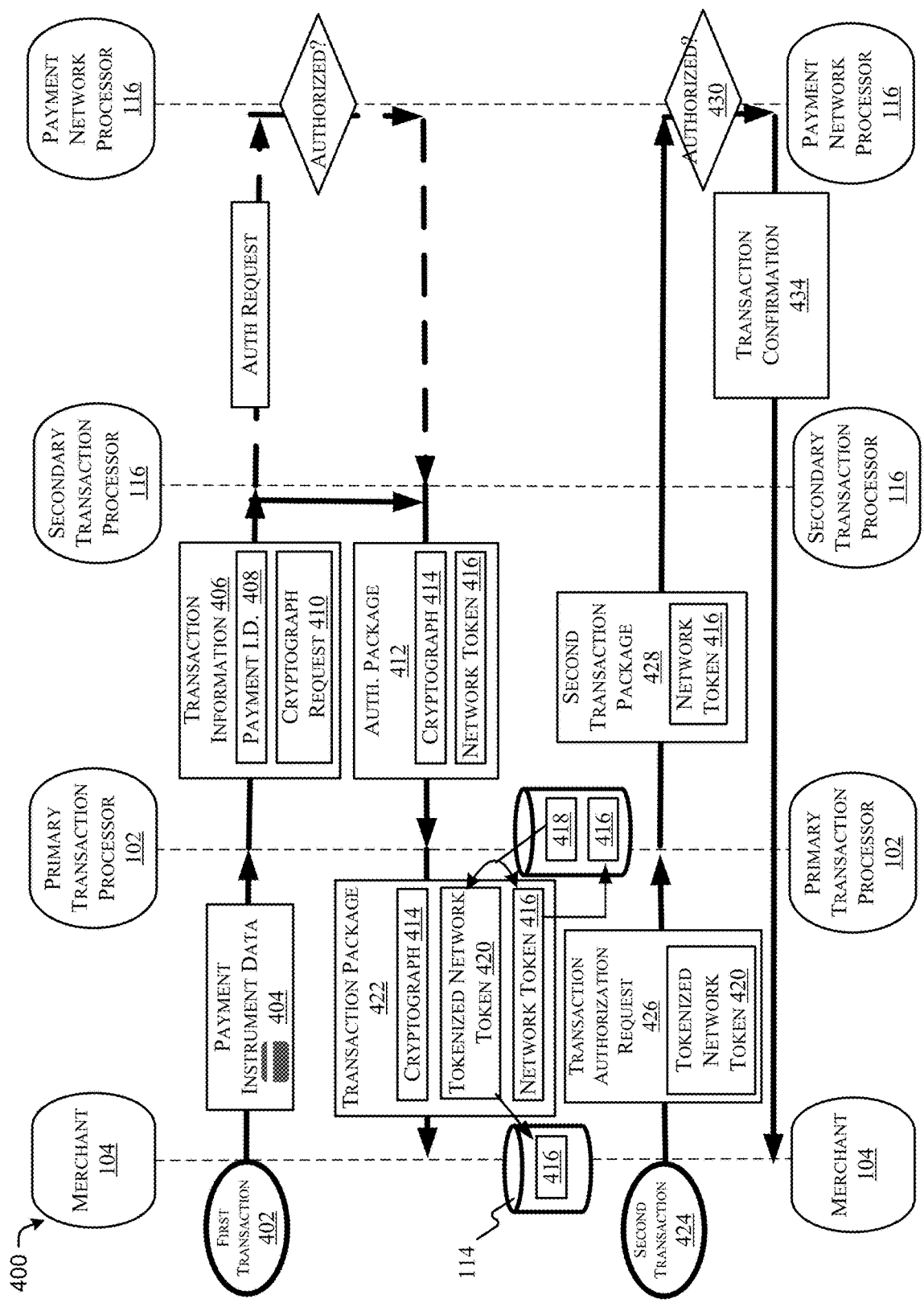
FIG. 4 is a flow diagram illustrating example communications within the system of FIG. 1 according to an embodiment.

FIG. 4 is a flow diagram illustrating another example communication flow within the system of FIG. 1 according to an embodiment. More particularly, the flow diagram of FIG. 4 illustrates obtaining a network token for a first transaction, then tokenizing the network token to provide flexibility to the merchant for processing the in the encapsulated transaction instrument 112. A first transaction 402 includes the same general steps as the first transaction 202 of FIG. 2, including forwarding payment instrument data 404 to the primary transaction processor 102. The transaction information 406 is included in an authorization request to the secondary transaction processor 118. In one aspect, the transaction information 406 includes a payment identification 408 that uniquely identifies attributes of the transaction including funds requested (cost associated with the transaction) the customer 108 identification, the transaction instrument 112 information, etc. In one aspect, the secondary processor 116 is a token issuer. Accordingly, the secondary transaction processor 118 may authorize the first transaction based on the transaction information 406 and forward an authorization package 412 that includes a cryptograph 414 and a network token 416.

The primary transaction processor 102 may save the network token 416 to in the token database 126. The token database 126 may be configured as a vault for network tokens that are associated with particular customers (e.g., the customer 108 who initiated the first transaction 402), an/or are associated with particular transaction instruments (e.g., the transaction instrument 112 tendered for payment for the first transaction 402). According to one transaction, when an approvable token that is associated with the vaulted network token 416 is received by the primary transaction processor 102, the primary transaction processor 102 may request a cryptograph from a token provider (either the secondary transaction processor 118 or the payment network 116) and process the authorization using the stored network token. This embodiment provides greater extensibility for payment processing by allowing the merchant to use any payment network processor and not a limited network of processors.

In the embodiment of FIG. 4, the primary transaction processor 102 may generate a token 420 that is associated with the network token 416. Stated in another way, the second token created by the primary transaction processor is a tokenized network token 420. The second token 420 is tokenized in that it uniquely points to the network token 416. The record of the correlation between the network token 416 and the second token 420 is stored as a correlation record 418. The association may be saved in the datastore 122 of the primary transaction processor 102.

In one example embodiment, both tokens (the network token 416 and the second token, which is the tokenized network token 420) are sent to the merchant 104 as part of a transaction package 422. In one embodiment, the transaction package 422 also includes the cryptograph 414, that can be used to process the first transaction 402. The merchant 104 may store the tokenized network token (the second token 420) in the merchant datastore 114 to use as a proxy for a card on file for the customer 108.

During a second transaction 424, the merchant 104 may transmit a transaction authorization request 426 that includes the tokenized network token 420. In one embodiment, the primary transaction processor receives the transaction authorization request 426, and authenticates the tokenized network token 420 using the correlation record 418, that points uniquely to the stored network token 416. The primary transaction processor 102 may request a cryptogram from a token provider (e.g., the payment network processor 116), and transmit a second transaction package 428 to the payment network processor 116. The second transaction package 428 may include the network token 416, which may be signed with the requested cryptograph for the second transaction 424. Responsive to an authorization decision 430, the payment network processor 116 may transmit a transaction confirmation 434 to the merchant 104.

In another embodiment, the network token 416 may be an unsigned network token 416, and the payment network processor 116 may accept the unsigned network token because it originates from a known sender (the primary transaction processor 102).

As shown in FIG. 4, the merchant 104 may now maintain an extensible token in its datastore 114 that does not expire due to time limitations such as those associated with network tokens that require cryptograms for acceptance by the payment network processor 116. At the same time, the merchant 104 may offer a card on file service without the technical problems associated with secure card number storage and processing.

Figure 5:
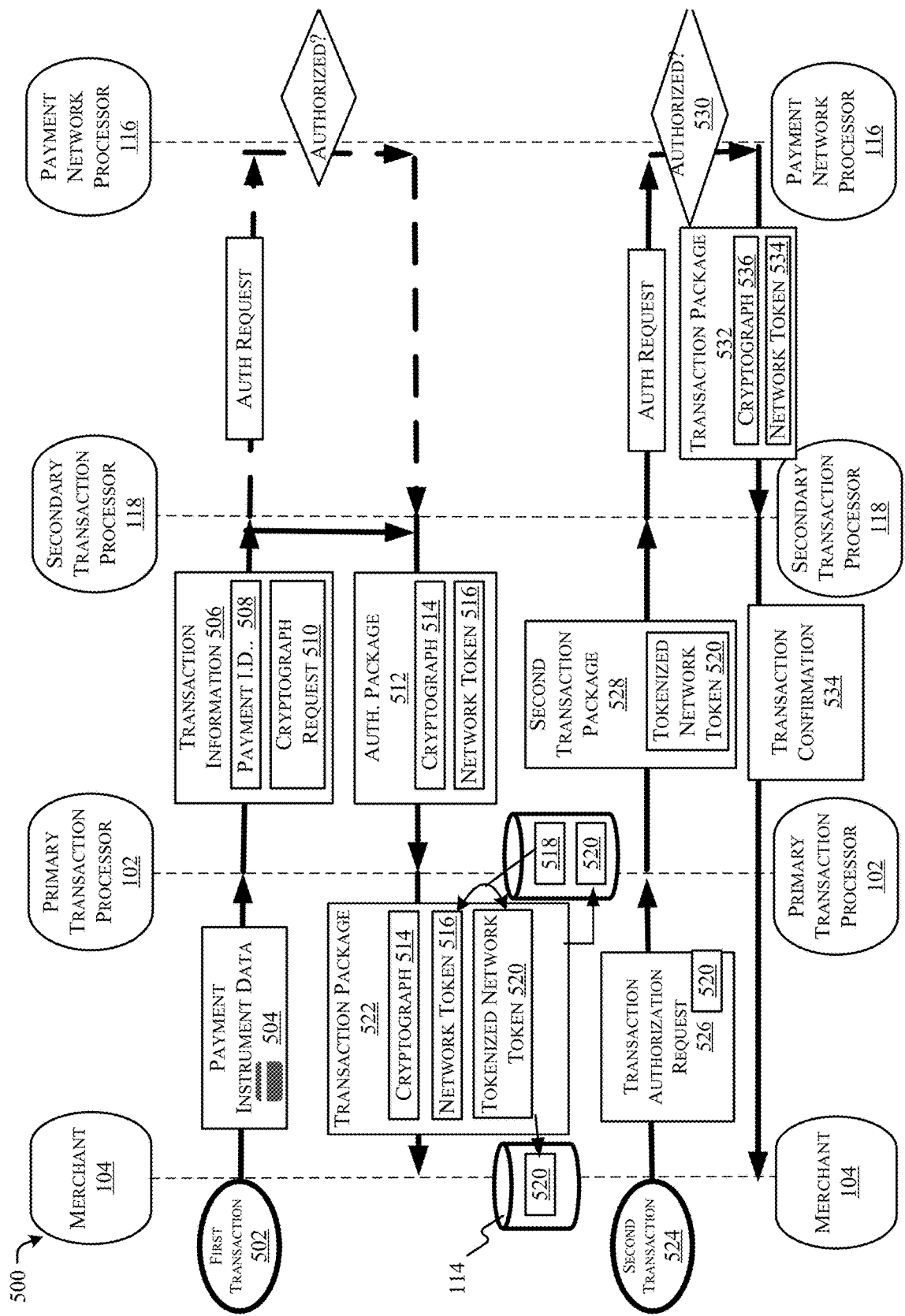
FIG. 5 is a is a flow diagram illustrating example communications within the system of FIG. 1 according to an embodiment.

FIG. 5 is a flow diagram illustrating another example communication flow 500 within the system of FIG. 1, according to an embodiment. More particularly, the flow diagram of FIG. 5 illustrates obtaining a network token for a first transaction, then tokenizing the network token to provide flexibility to the merchant for processing the in the encapsulated transaction instrument 112. In comparison to FIG. 4, however, the tokenized network token is not forwarded to the merchant 104, but instead used as a placeholder for the network token received from the first transaction, and the payment instrument data (e.g., the credit card number) is destroyed immediately after forwarding to the payment network processor 116 during the first transaction. With this embodiment, the network token (which is usable only once after signing with a cryptogram) is made into a non-network token that serves as a placeholder for the payment instrument data. Accordingly, the primary transaction processor 102 may reduce or eliminate the liability associated with storing PANS in the datastore 122.

The first transaction steps of FIG. 5 are substantially similar to those explained in FIG. 4. For example, a first transaction 502 includes the same general steps as the first transaction 402 of FIG. 4, including forwarding payment instrument data 504 to the primary transaction processor 102. The transaction information 506 is included in an authorization request to the secondary transaction processor 118. In one aspect, the transaction information 506 includes a payment identification 508 that uniquely identifies attributes of the transaction including funds requested (cost associated with the transaction) the customer 108 identification, the transaction instrument 112 information, etc. In one aspect, the secondary processor 116 is a token issuer. Accordingly, the secondary transaction processor 118 may authorize the first transaction based on the transaction information 506 and forward an authorization package 512 that includes a cryptograph 514 and a network token 516.

The primary transaction processor 102 may save the network token 516 to in the token database 126. The token database 126 may be configured as a vault for tokenized network tokens that are associated with particular customers (e.g., the customer 108 who initiated the first transaction 502), an/or are associated with particular transaction instruments (e.g., the transaction instrument 112 tendered for payment for the first transaction 502). According to one transaction, when an approvable token that is associated with the vaulted network token 516 is received by the primary transaction processor 102, the primary transaction processor 102 may forward the network token to the secondary transaction processor 118, who recognizes the request as valid based on the tokenized token. The secondary transaction processor 118 requests a cryptograph from a token provider (the payment network 116) and processes the authorization using the network token and cryptograph received in response. This embodiment provides full extensibility for payment processing by allowing the merchant to use any payment network processor, and enhances security by eliminating a source of potential data breach because the primary transaction processor 102 does not keep the payment instrument data 504.

In the embodiment of FIG. 5, the primary transaction processor 102 may generate a token 520 that is associated with the network token 516. Stated in another way, the second token created by the primary transaction processor is a tokenized network token 520. The second token 520 is tokenized in that it uniquely points to the network token 516. The record of the correlation between the network token 516 and the second token 520 is stored as a correlation record 518. The association may be saved in the datastore 122 of the primary transaction processor 102.

In one example embodiment, only the tokenized network token 520 is sent to the merchant 104 as part of a transaction package 522. The merchant 104 may store the tokenized network token (the second token 520) in the merchant datastore 114 to use as a proxy for a card on file for the customer 108.

During a second transaction 524, the merchant 104 may transmit a transaction authorization request 526 that includes the tokenized network token 520. In one embodiment, the primary transaction processor receives the transaction authorization request 526, and forwards the second transaction package 522 to the secondary transaction processor 118 after authenticating the tokenized network token 520 using the correlation record 518, that points uniquely to the network token 516. The secondary transaction processor 118 may request a cryptogram from a token provider (e.g., the payment network processor 116), and transmit the second transaction package 528 to the secondary transaction processor 118. In one embodiment, the secondary transaction processor 118 may request a new cryptograph 536 and network token 534, and forward them as a third transaction package 532. The third transaction package 532 may include another network token 534, which may be signed with the requested cryptograph 536 for the second transaction 528. The secondary transaction processor 118 may transmit a transaction confirmation 534 to the merchant 104 responsive to an approved transaction response from the payment network processor 116.

Figure 6:
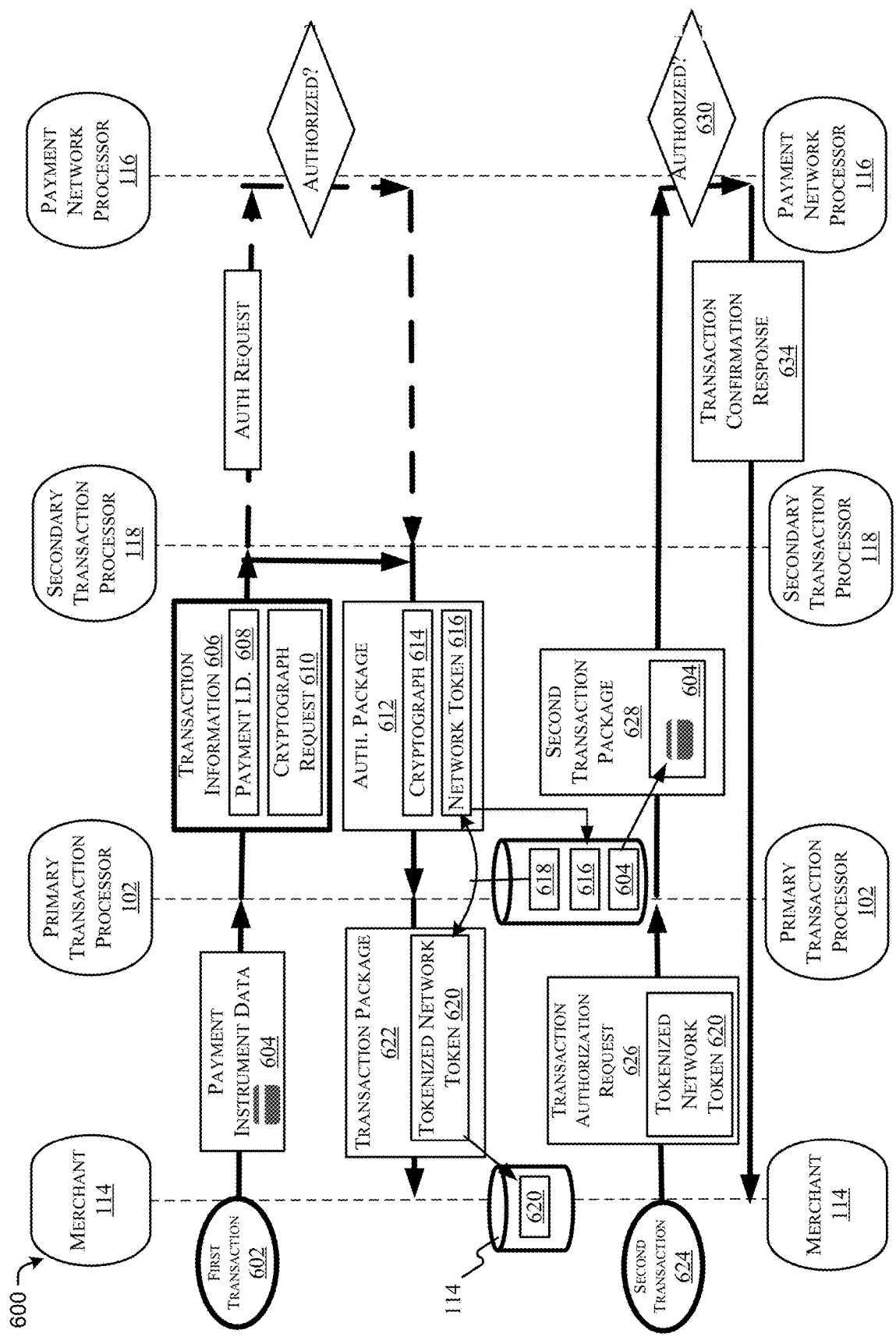
FIG. 6 is a flow diagram illustrating example communications within the system of FIG. 1 according to an embodiment.

In another embodiment, it may be advantageous to provide a card on file benefit to the merchant 104 by linking a tokenized network token from a prior transaction to a stored payment instrument associated with the customer 108, who is making a repeat transaction with the same merchant 104. FIG. 6 illustrates another flow diagram 600 that illustrates example communications within the system of FIG. 1, according to an embodiment.

The first transaction steps of FIG. 6 are substantially similar to those explained in FIGS. 4 and 5. For example, a first transaction 502 includes the same general steps as the first transaction 402 of FIG. 4 (and/or the first transaction 502 of FIG. 5), including forwarding payment instrument data 604 to the primary transaction processor 102. The transaction information 606 is included in an authorization request to the secondary transaction processor 118. In one aspect, the transaction information 606 includes a payment identification 608 that uniquely identifies attributes of the transaction including funds requested (cost associated with the transaction) the customer 108 identification, the transaction instrument 112 information, etc. In one aspect, the secondary processor 116 is a token issuer. Accordingly, the secondary transaction processor 118 may authorize the first transaction based on the transaction information 606 and forward an authorization package 612 that includes a cryptograph 614 and a network token 616.

The primary transaction processor 102 may save the network token 616 to in the token database 126. The token database 126 may be configured as a vault for tokenized network tokens that are associated with particular customers (e.g., the customer 108 who initiated the first transaction 602), an/or are associated with particular transaction instruments (e.g., the transaction instrument 112 tendered for payment for the first transaction 602). According to one transaction, when an approvable token that is associated with the vaulted network token 616 is received by the primary transaction processor 102, the primary transaction processor 102 may forward the network token to the secondary transaction processor 118, who recognizes the request as valid based on the tokenized token. The secondary transaction processor 118 requests a cryptograph from a token provider (the payment network 116) and processes the authorization using the network token and cryptograph received in response. This embodiment provides increased extensibility for payment processing by allowing the merchant to use any payment network processor without limitation to the provider of the token, and enhances security by eliminating a source of potential data breach because the primary transaction processor 102 does not keep the payment instrument data 604.

In the embodiment of FIG. 6, the primary transaction processor 102 may generate a token 620 that is associated with the network token 616. Stated in another way, the second token created by the primary transaction processor 102 is a tokenized network token 620. The second token 620 is tokenized in that it uniquely points to the network token 616. The record of the correlation between the network token 616 and the second token 620 is stored as a correlation record 618. The association may be saved in the datastore 122 of the primary transaction processor 102.

In one example embodiment, only the tokenized network token 620 is sent to the merchant 104 as part of a transaction package 622. The merchant 104 may store the tokenized network token (the second token 620) in the merchant datastore 114 to use as a proxy for a card on file for the customer 108.

During a second transaction 624, the merchant 104 may transmit a transaction authorization request 626 that includes the tokenized network token 620. In one embodiment, the primary transaction processor 102 receives the transaction authorization request 626, and forwards the second transaction package 622 to the secondary transaction processor 118 after authenticating the tokenized network token 620 using the correlation record 518, that points uniquely to the network token 616.

In the embodiment of FIG. 6, differs here from the embodiment of FIG. 5 in that the second transaction package 622 includes the payment instrument data 604 stored in the transaction instruments datastore 130. In that sense, the primary transaction processor 102 provides a vault service to the merchant to maintain the card on file, and issues the tokenized network token 620 to the merchant for the merchant's local storage. Because the primary transaction processor 102 can authenticate the second transaction 624 using the second token, the secondary transaction processor 118 can avoid the network traffic and time associated with another request a cryptogram from a token provider (e.g., the payment network processor 116) during future repeat transactions involving the same customer 108 using the same transaction instrument 112. Accordingly, the payment network processor 116 may transmit a transaction confirmation 634 to the merchant 104 directly, while the merchant 104 maintains the flexibility of a fully-extensible card on file without the liability and infrastructure needed to store transaction instruments locally.

Each of the above scenarios is merely an example and many variations are possible. Moreover, many variations of the techniques discussed above are possible as well without departing from the scope of this disclosure.

Figure 7:
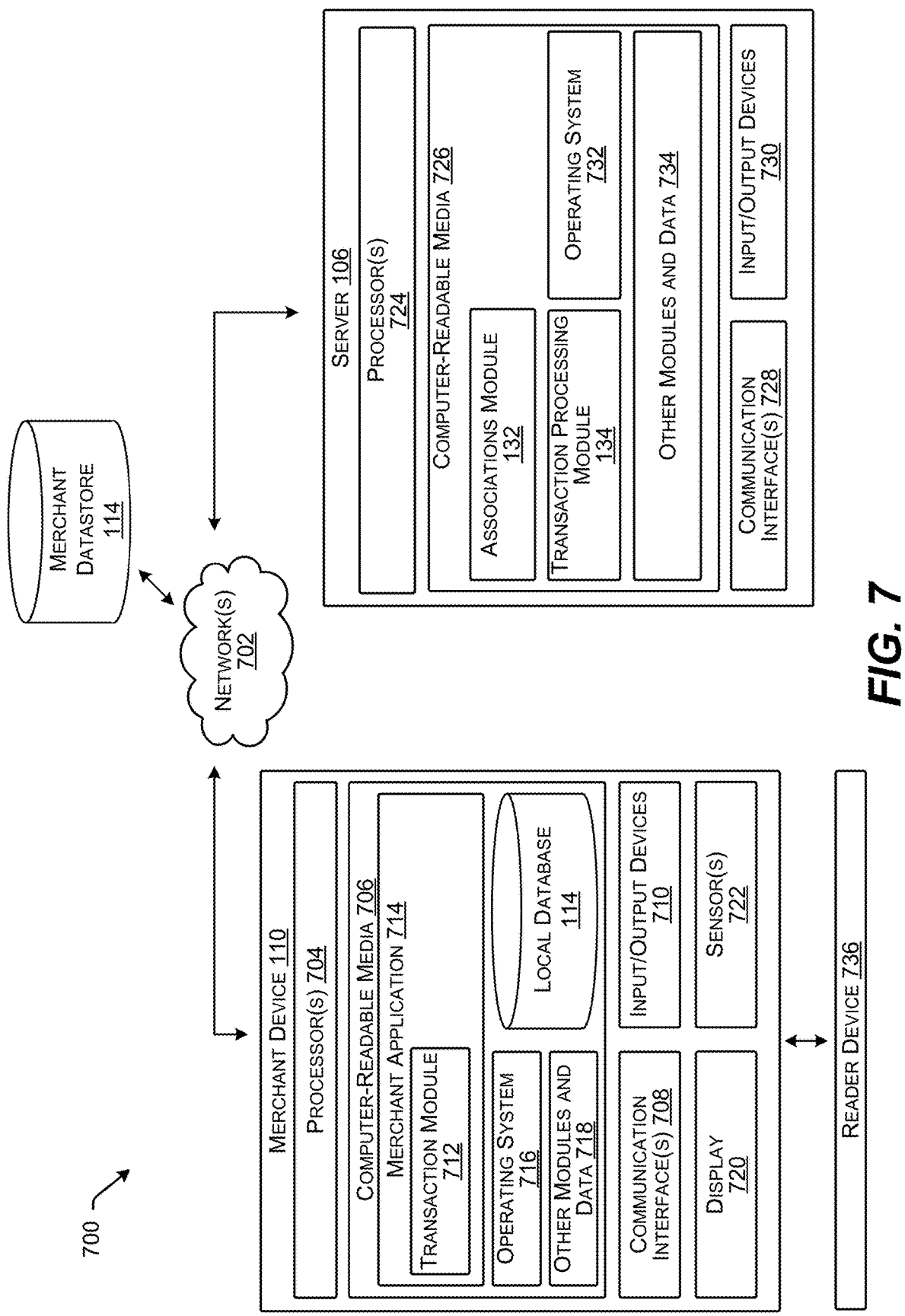
FIG. 7 illustrates an example system for enabling techniques as described herein.

FIG. 7 depicts an illustrative block diagram illustrating a system 700 for performing techniques described herein. The system 700 includes a merchant device 110, that communicates with one or more server computing device (e.g., server 106) via network(s) 702 (e.g., the Internet, cable network(s), cellular network(s), wireless network(s) (e.g., Wi-Fi) and wired network(s), as well as close-range communications such as Bluetooth®, Bluetooth® low energy, and the like). The network 702 may be the same network as network 136 described with respect to FIG. 1, or alternatively, the network 702 may have connectivity with the network 136. In at least one example, such as the example illustrated in FIGS. 1 and 10, a reader device 736 can be external to, and wirelessly coupled to, the merchant device 110. However, in an alternate example, the reader device 736 can be integral to, or integrated with, the merchant device 110. While a single merchant device 110 and reader device 736 are illustrated, in additional or alternate examples, the system 700 can have multiple merchant devices and/or reader devices.

In at least one example, the merchant device 110 can be any suitable type of computing device, e.g., portable, semi-portable, semi-stationary, or stationary. Some examples of the merchant device 110 can include tablet computing devices: smart phones and mobile communication devices: laptops, netbooks and other portable computers or semi-portable computers: desktop computing devices, terminal computing devices and other semi-stationary or stationary computing devices; dedicated register devices: wearable computing devices, or other body-mounted computing devices: augmented reality devices: or other computing devices capable of sending communications and performing the functions according to the techniques described herein. In the illustrated example, the merchant device 110 includes one or more processors 704, one or more computer-readable media 706, one or more communication interfaces 708, and one or more input/output (I/O) devices 710. Each processor 704 can itself comprise one or more processors or processing cores. For example, the processor(s) 704 can be implemented as one or more microprocessors, microcomputers, microcontrollers, digital signal processors, central processing units, state machines, logic circuitries, and/or any devices that manipulate signals based on operational instructions. In some examples, the processor(s) 704 can be one or more hardware processors and/or logic circuits of any suitable type specifically programmed or configured to execute the algorithms and processes described herein. The processor(s) 704 can be configured to fetch and execute computer-readable processor-executable instructions stored in the computer-readable media 706.

Depending on the configuration of the merchant device 110, the computer-readable media 706 can be an example of tangible non-transitory computer storage media and can include volatile and nonvolatile memory and/or removable and non-removable media implemented in any type of technology for storage of information such as computer-readable processor-executable instructions, data structures, program modules or other data. The computer-readable media 706 can include, but is not limited to, RAM, ROM, EEPROM, flash memory, solid-state storage, magnetic disk storage, optical storage, and/or other computer-readable media technology. Further, in some examples, the merchant device 110 can access external storage, such as RAID storage systems, storage arrays, network attached storage, storage area networks, cloud storage, or any other medium that can be used to store information and that can be accessed by the processor(s) 704 directly or through another computing device or network. Accordingly, the computer-readable media 706 can be computer storage media able to store instructions, modules or components that can be executed by the processor(s) 704. Further, when mentioned, non-transitory computer-readable media exclude media such as energy, carrier signals, electromagnetic waves, and signals per se.

The computer-readable media 706 can be used to store and maintain any number of functional components that are executable by the processor(s) 704. In some implementations, these functional components comprise instructions or programs that are executable by the processor(s) 704 and that, when executed, implement operational logic for performing the actions and services attributed above to the merchant device 110. Functional components stored in the computer-readable media 706 can include the merchant application 714, which can include the transaction processing module 134.

The merchant application 714 can provide POS functionality to the merchant device 110 to enable the merchant to accept payments from one or more customers at a POS location. For example, the merchant can use the merchant device 110 to accept payments through various different types of payment instruments, e.g., payment cards, electronic payment, cash or check, cryptocurrency, etc. at the POS location from the one or more customers. Furthermore, as described above, in some examples, the merchant can use the merchant device 110 to accept identifiers and/or utilize the identifiers and/or personal identifiers associated with payment data for processing transactions. In at least one example, the transaction module 712 can present various user interfaces to enable a merchant to conduct transactions, receive payments, and so forth. In at least one example, the transaction module 712 can send data associated with the payments (e.g., transaction data) to the server 106.

Furthermore, the computer-readable media 706 can include additional functional components, such as an operating system 716 for controlling and managing various functions of the merchant device 110 and for enabling basic user interactions. In addition, the computer-readable media 706 can also store data, data structures and the like, that are used by the functional components. Depending on the type of the merchant device 110, the computer-readable media 706 can also optionally include other functional components and data, such as other modules and data 718, which can include programs, drivers, etc., and the data used or generated by the functional components. Further, the merchant device 110 can include many other logical, programmatic and physical components, of which those described are merely examples that are related to the discussion herein. In at least one example, the merchant device 110 can include the local datastore 114, as described above with reference to FIG. 6.

The communication interface(s) 708 can include one or more interfaces and hardware components for enabling communication with various other devices, such as over the network(s) 702 or directly. For example, communication interface(s) 708 can enable communication through one or more of the Internet, cable networks, cellular networks, wireless networks (e.g., Wi-Fi) and wired networks, as well as close-range communications such as Bluetooth®, Bluetooth® low energy, and the like, as additionally enumerated elsewhere herein.

The merchant device 110 can further include the one or more I/O devices 710. The I/O devices 710 can include speakers, a microphone, a camera, and various user controls (e.g., buttons, a joystick, a keyboard, a keypad, etc.), a haptic output device, and so forth.

In at least one example, merchant device 110 can include a display 720. Depending on the type of computing device(s) used as the merchant device 110, the display 720 can employ any suitable display technology. For example, the display 720 can be a liquid crystal display, a plasma display, a light emitting diode display, an OLED (organic light-emitting diode) display, an electronic paper display, or any other suitable type of display able to present digital content thereon. In some examples, the display 720 can have a touch sensor associated with the display 720 to provide a touchscreen display configured to receive touch inputs for enabling interaction with a graphic interface presented on the display 720. Accordingly, implementations herein are not limited to any particular display technology. Alternatively, in some examples, the merchant device 110 may not include the display 720, and information can be presented by other means, such as aurally.

In addition, the merchant device 110 can include sensor(s) 722. The sensor(s) 722 can include a GPS device able to indicate location information. Further, the sensor(s) 722 can include, but are not limited to, an accelerometer, gyroscope, compass, proximity sensor, camera, microphone, and/or a switch. Additionally, the merchant device 110 can include various other components that are not shown, examples of which include removable storage, a power source, such as a battery and power control unit, a barcode scanner, a printer, a cash drawer, and so forth.

In addition, in some examples, the merchant device 110 can include or can be connectable to a reader device 736, for reading payment instruments and/or identifiers associated with payment objects. In some examples, as described above, the reader device 736 can plug in to a port in the merchant device 110, such as a microphone/headphone port, a data port, or other suitable port. The reader device 736 can include a read head for reading a magnetic strip of a payment card, and further can include encryption technology for encrypting the information read from the magnetic strip. Additionally or alternatively, the reader device 736 can be a Europay, MASTERCARD®, VISA® (EMV) payment reader, which in some examples, can be embedded in the merchant device 110. Moreover, numerous other types of readers can be employed with the merchant device 110 herein, depending on the type and configuration of the merchant device 110. As described above, in some examples, the reader device 736 can be configured to read identifiers from payment objects (e.g., RFID-enabled wristbands, digital wallets functioning as part of a mobile device, non-payment cards, etc.).

The server 106 (or alternatively, servers 106) can include one or more servers or other types of computing devices that can be embodied in any number of ways. For example, in the example of a server, the modules, other functional components, and data can be implemented on a single server, a cluster of servers, a server farm or data center, a cloud-hosted computing service, a cloud-hosted storage service, and so forth, although other computer architectures can additionally or alternatively be used.

Further, while the figures illustrate the components and data of the server 106 as being present in a single location, these components and data can alternatively be distributed across different computing devices and different locations in any manner. Consequently, the functions can be implemented by one or more server computing devices, with the various functionality described above distributed in various ways across the different computing devices. Multiple servers 106 can be located together or separately, and organized, for example, as virtual servers, server banks and/or server farms. The described functionality can be provided by the servers of a single merchant or enterprise, or can be provided by the servers and/or services of multiple different customers or enterprises.

In the illustrated example, the server 106 can include one or more processors 724, one or more computer-readable media 726, one or more communication interfaces 728, and one or more input/output devices 730. Each processor 724 can be a single processing unit or a number of processing units, and can include single or multiple computing units or multiple processing cores. The processor(s) 724 can be implemented as one or more microprocessors, microcomputers, microcontrollers, digital signal processors, central processing units, state machines, logic circuitries, and/or any devices that manipulate signals based on operational instructions. For example, the processor(s) 724 can be one or more hardware processors and/or logic circuits of any suitable type specifically programmed or configured to execute the algorithms and processes described herein. The processor(s) 724 can be configured to fetch and execute computer-readable instructions stored in the computer-readable media 726, which can program the processor(s) 724 to perform the functions described herein.

The computer-readable media 726 can include volatile and nonvolatile memory and/or removable and non-removable media implemented in any type of technology for storage of information, such as computer-readable instructions, data structures, program modules, or other data. Such computer-readable media 726 can include, but is not limited to, RAM, ROM, EEPROM, flash memory or other memory technology, optical storage, solid state storage, magnetic tape, magnetic disk storage, RAID storage systems, storage arrays, network attached storage, storage area networks, cloud storage, or any other medium that can be used to store the desired information and that can be accessed by a computing device. Depending on the configuration of the server 106, the computer-readable media 726 can be a type of computer-readable storage media and/or can be a tangible non-transitory media to the extent that when mentioned, non-transitory computer-readable media exclude media such as energy, carrier signals, electromagnetic waves, and signals per se.

The computer-readable media 726 can be used to store any number of functional components that are executable by the processors 724. In many implementations, these functional components comprise instructions or programs that are executable by the processors 724 and that, when executed, specifically configure the one or more processors 724 to perform the actions attributed above to the service provider and/or payment processing service. Functional components stored in the computer-readable media 726 can include the associations module 132, and the transaction processing module 134. At least some of the functionality associated with the associations module 132, and the transaction processing module 134. Additional functional components stored in the computer-readable media 726 can include an operating system 732 for controlling and managing various functions of the server 106.

In at least one example, the computer-readable media 726 can include or maintain other functional components and data, such as the associations module 132, the transaction processing module 134, and the operating system 732. The computer-readable media 726 can also include other modules and data 734, which can include programs, drivers, etc., and the data used or generated by the functional components. At least some of the databases described above with reference to FIGS. 1-7 can be included and/or maintained in the other modules and data 734. In additional or alternate examples, one or more of the databases can be remotely located from the server 106 and data stored in such databases can be accessible to the server 106, as shown in FIG. 7. Further, the server 106 can include many other logical, programmatic and physical components, of which those described above are merely examples that are related to the discussion herein.

The communication interface(s) 728 can include one or more interfaces and hardware components for enabling communication with various other devices, such as over the network(s) 702. For example, communication interface(s) 728 can enable communication through one or more of the Internet, cable networks, cellular networks, wireless networks (e.g., Wi-Fi) and wired networks, as well as close-range communications such as Bluetooth®, Bluetooth® low energy, and the like, as additionally enumerated elsewhere herein.

The server 106 can further be equipped with various input/output (I/O) devices 730. Such I/O devices 730 can include a display, various user interface controls (e.g., buttons, joystick, keyboard, mouse, touch screen, etc.), audio speakers, connection ports and so forth.

The foregoing is merely illustrative of the principles of this disclosure and various modifications can be made by those skilled in the art without departing from the scope of this disclosure. The above described examples are presented for purposes of illustration and not of limitation. The present disclosure also can take many forms other than those explicitly described herein. Accordingly, it is emphasized that this disclosure is not limited to the explicitly disclosed methods, systems, and apparatuses, but is intended to include variations to and modifications thereof, which are within the spirit of the following claims.

As a further example, variations of apparatus or process limitations (e.g., dimensions, configurations, components, process step order, etc.) can be made to further optimize the provided structures, devices and methods, as shown and described herein. In any event, the structures and devices, as well as the associated methods, described herein have many applications. Therefore, the disclosed subject matter should not be limited to any single example described herein, but rather should be construed in breadth and scope in accordance with the appended claims.

What is claimed is:

1. A method comprising:
   transmitting, from a merchant device of a merchant to a primary transaction processor server, first transaction information associated with a first transaction between the merchant and a customer for at least one of first goods or first services, wherein the first transaction information includes transaction instrument data associated with a transaction instrument of the customer;
   receiving, by the merchant device from the primary transaction processor server, a second token generated from an authorization package associated with the first transaction, wherein the second token comprises a cryptograph and a first network token, wherein the authorization package includes an indication that the first transaction is approved;
   completing, by the merchant device, the first transaction using the first network token signed using the cryptograph;
   generating, by the merchant device, second transaction information associated with a subsequent transaction of the merchant and the customer for at least one of second goods or second services, wherein the second transaction information includes the second token instead of the transaction instrument data;
   modifying, by the merchant device, the second transaction information by including a token identification field associated with the second token;
   assigning, by the merchant device, an alpha numeric value to the token identification field indicative of an entity that initiated the first transaction;
   transmitting the second transaction information from the merchant device to a secondary transaction processor; and
   receiving, at the merchant device, from a payment network processor, a transaction confirmation response responsive to the second transaction information.

2. The method of claim 1, wherein the primary transaction processor server is caused to transmit the first transaction information to a secondary transaction processor server, the authorization package generated by the secondary transaction processor server based on the first transaction information.

3. The method of claim 2, wherein the first transaction information includes a cryptograph request, and wherein the secondary transaction processor server is caused to:
   forward at least a portion of the first transaction information to the payment network processor for authorization; and
   generate the authorization package in response to the cryptograph request based on the response received from the payment network processor.

4. The method of claim 1, wherein the primary transaction processor server maintains a mapping between the first network token and the second token.

5. The method of claim 1, wherein the second transaction information is not provided to the primary transaction processor server prior to receiving the transaction confirmation response.

6. The method of claim 1, wherein the entity associated with the first transaction comprises one of the merchant if the subsequent transaction is a merchant-initiated transaction or the customer if the subsequent transaction is a customer-initiated transaction.

7. A merchant computing device comprising:
   one or more processors; and
   one or more non-transitory computer-readable media storing computer-executable instructions that, when executed by the one or more processors, cause the merchant computing device to perform operations comprising:
   transmitting, from the merchant computing device of a merchant and to a primary transaction processor server, first transaction information associated with a first transaction between the merchant and a customer for at least one of first goods or first services, wherein the first transaction information includes transaction instrument data associated with a transaction instrument of the customer;
   receiving, by the merchant computing device and from the primary transaction processor server, a second token generated from an authorization package associated with the first transaction, wherein the second token comprises at least a first network token, wherein the authorization package includes an indication that the first transaction is approved;
   generating second transaction information associated with a subsequent transaction of the merchant and the customer for at least one of second goods or second services, to include the second token instead of the transaction instrument data;
   modifying, by the merchant computing device, the second transaction information by including a token identification field associated with the second token;
   assigning, by the merchant computing device, an alpha numeric value to the token identification field indicative of an entity that initiated the first transaction;

transmitting the second transaction information to a secondary transaction processor; and receiving, by the merchant computing device and from a payment network processor, a transaction confirmation response responsive to the second transaction information.

8. The merchant computing device of claim 7, wherein the secondary transaction processor is caused to authenticate the second transaction information based at least in part on the alpha numeric value, and wherein the secondary transaction processor, upon authenticating the second transaction information, is further caused to:

submit a request for a cryptogram to a payment processing network;

generate a third network token using the cryptogram provided by the payment processing network;

replace the second token in the second transaction information with the third network token; and provide the second transaction information to the payment processing network for authorization.

9. The merchant computing device of claim 8, wherein the third network token is signed using the cryptogram.

10. The merchant computing device of claim 7, wherein the alpha numeric value comprises an indicator as to whether the subsequent transaction is a merchant-initiated transaction or a customer-initiated transaction.

11. The merchant computing device of claim 7, wherein the primary transaction processor server is caused to forward the transaction instrument data to a secondary transaction processor server and not store the transaction instrument data.

12. The merchant computing device of claim 7, the operations further comprising causing the merchant computing device to instantiate an I-frame portal, wherein the first transaction information is transmitted to the primary transaction processor server via the I-frame portal.

13. A non-transitory computer-readable medium having instructions stored thereupon which, when executed by a processor, cause the processor to:

transmit, by a merchant computing device of a merchant and to a primary transaction processor server, first transaction information associated with a first transaction between the merchant and a customer for at least one of first goods or first services, wherein the first transaction information includes transaction instrument data associated with a transaction instrument of the customer;

receive, by the merchant computing device and from the primary transaction processor server, a second token generated from an authorization package associated with the first transaction, wherein the second token comprises at least a first network token, wherein the authorization package includes an indication that the first transaction is approved;

generate, by the merchant computing device, second transaction information associated with a subsequent transaction of the merchant and the customer for at least one of second goods or second services to include the second token instead of the transaction instrument data;

modify, by the merchant computing device, the second transaction information by including an alpha numeric token identification field associated with the second token;

assign, by the merchant computing device, an alpha numeric value to the alpha numeric token identification field indicative of an entity associated with the first transaction;

transmit the second transaction information to a secondary transaction processor; and receive, by the merchant computing device and from a payment network processor, a transaction confirmation response responsive to the second transaction information.

14. The non-transitory computer-readable medium of claim 13, wherein the primary transaction processor server is caused to transmit the first transaction information to a secondary transaction processor server, the authorization package generated by the secondary transaction processor server based on the first transaction information.

15. The non-transitory computer-readable medium of claim 14, wherein the secondary transaction processor server is caused to:

forward at least a portion of the first transaction information to the payment network processor for authorization; and generate the authorization package based on a response received from the payment network processor.

16. The method of claim 1, further comprising:

determining that the primary transaction processor server is not available, wherein transmitting the second transaction information to the secondary transaction processor is based at least in part on determining that the primary transaction processor server is not available.

17. The method of claim 1, wherein the secondary transaction processor is caused to authenticate the second transaction information based on the alpha numeric value of the token identification field indicating that initiator of the first transaction is the initiator of the subsequent transaction.

18. The method of claim 1, wherein the cryptograph is time-limited.

19. The merchant computing device of claim 7, wherein the primary transaction processor server maintains a mapping between the first network token and the second token.

20. The merchant computing device of claim 7, the operations further comprising completing, by the merchant computing device, the first transaction using the first network token.

* * * * *